(12) United States Patent
Li et al.

(10) Patent No.: US 11,598,424 B2
(45) Date of Patent: Mar. 7, 2023

(54) SEALING DEVICE

(71) Applicant: ABB Schweiz AG, Baden (CH)

(72) Inventors: Shanghua Li, Västerås (SE); Jiangwei Huang, Västerås (SE)

(73) Assignee: ABB Schweiz AG, Baden (CH)

( * ) Notice: Subject to any disclaimer, the term of this patent is extended or adjusted under 35 U.S.C. 154(b) by 231 days.

(21) Appl. No.: 17/051,274

(22) PCT Filed: May 3, 2018

(86) PCT No.: PCT/EP2018/061290
§ 371 (c)(1),
(2) Date: Oct. 28, 2020

(87) PCT Pub. No.: WO2019/210954
PCT Pub. Date: Nov. 7, 2019

(65) Prior Publication Data
US 2021/0231218 A1 Jul. 29, 2021

(51) Int. Cl.
*F16J 15/34* (2006.01)
(52) U.S. Cl.
CPC ......... *F16J 15/3404* (2013.01); *F16J 15/344* (2013.01)
(58) Field of Classification Search
CPC .............................. F16J 15/3404; F16J 15/344
See application file for complete search history.

(56) References Cited

U.S. PATENT DOCUMENTS

| 3,333,598 A | 8/1967 | Marcel |
| 4,410,186 A * | 10/1983 | Pierce, Jr. ............. F16L 23/167 |
| | | 277/318 |
| 5,141,261 A | 8/1992 | Ziu |
| 8,172,272 B2 | 5/2012 | Petit et al. |

(Continued)

FOREIGN PATENT DOCUMENTS

| EP | 148813 A2 | 7/1985 |
| FR | 2596495 A1 | 10/1987 |
| WO | WO-2018102965 A1 * | 6/2018 .......... B25J 19/0079 |

OTHER PUBLICATIONS

International Search Report and Written Opinion of the International Searching Authority; Application No. PCT/EP2018/061290; Completed on: Jan. 24, 2019; dated Feb. 1, 2019; 12 Pages.

*Primary Examiner* — Vishal A Patel
(74) *Attorney, Agent, or Firm* — Whitmyer IP Group LLC (57) ABSTRACT

A sealing device (10) for providing a fluid-tight sealing of a joint comprising a first part (30) and a second part (32) with a relative movement in between. The sealing device (10) comprises: an outer sealing part (12) designed to contact the first part and the second part, an inner sealing part (14) designed to contact the first part and the second part, and a spacing structure (16) connecting the outer sealing part (12) and the inner sealing part (14). The outer sealing part (12) and the inner sealing part (14) define an intermediate space (18) between the outer sealing part (12) and the inner sealing part (14). The outer sealing part (12) and the inner sealing part (14) are being configured to seal off the intermediate space (18) from both an exterior and an interior of the joint, and the intermediate space (18) is configured to be influid contact with both the first part (30) and the second part (32).

12 Claims, 4 Drawing Sheets

(56) References Cited

U.S. PATENT DOCUMENTS

| | | | | |
|---|---|---|---|---|
| 8,894,070 B2* | 11/2014 | Bhat | ............... | E21B 33/126 |
| | | | | 277/553 |
| 9,033,054 B2* | 5/2015 | Curington | ............ | F16J 15/0887 |
| | | | | 166/373 |
| 9,388,890 B2* | 7/2016 | Garrett | ............... | F16H 25/2418 |
| 2007/0145691 A1 | 6/2007 | Katsura | | |

* cited by examiner

SEALING DEVICE

TECHNICAL FIELD

The present disclosure relates to a sealing device for providing a fluid-tight sealing of a joint comprising a first part and a second part with a relative movement in between. The disclosure also relates to a robot comprising at least one sealing device.

BACKGROUND

Equipment used in the food processing of protein industry (i.e. meat, poultry, fish, seafood and dairy) is subject to strict hygiene requirements and must be washed down daily using hot high pressure water and chemical agents. A robot intended for food processing in wash down applications should have a complete stainless-steel frame which is hygienically designed to be easy to clean. The robot needs to have a high water protection rating—Ingress Protection 69K (IP69K). The IP69K rating defines what is needed to provide protection against ingress of dust and high temperature, high pressure water—making products with this certification suitable for use in conditions where equipment must be carefully sanitized. In industries such as food processing, where hygiene and cleanliness is paramount, equipment must be able to withstand rigorous high pressure, high temperature wash-down procedures. In many industries, where dust and dirt can be an issue, it is important to ensure that dust cannot penetrate the casing of a product and cause it to fail. The IP69K rating is the highest protection available.

EHEDG (European Hygienic Engineering and Design Group) stands for the highest hygienic design criteria for food equipment/machine in the world. EHEDG has been strong in "closed equipment" (e.g. for dairy industry) but just started to look at "open equipment" such as motors, gears and robots. The best dynamic sealing solution that EHEDG prefers today is what they described in EHEDG Guidelines "Hygienic design of closed equipment for processing of liquid food", doc 10, Second Edition, May 2007, p. 13 as a "double shaft seal for aseptic equipment" which is used in some closed equipment. The seal is fitted between a rotating shaft and a stationary part, to reduce the volume of an annular gap around the shaft and thereby improve cleanability. The space between the seals of the double shaft seal must be flushed with a sterile fluid (e.g. condensate, sterile water or steam) to scavenge micro-organisms that enter the space between the seals. Which flushing fluid should be used will depend on the product (food) and the process.

To get an EHEDG certificate on the hygienic design of a robot would be a great market advantage.

SUMMARY

It is thus an object of the disclosure to provide a sealing solution that would fulfil the requirements of a coming EHEDG standard for open food equipment. It is a further object to provide a sealing solution that is easy to assemble. This object and others are at least partly achieved by the device and robot according to the independent claims, and by the embodiments according to the dependent claims.

According to a first aspect, the disclosure relates to a sealing device for providing a fluid-tight sealing of a joint comprising a first part and a second part with a relative movement in between. The sealing device comprises an outer sealing part designed to contact the first part and the second part, an inner sealing part designed to contact the first part and the second part, and a spacing structure connecting the outer sealing part and the inner sealing part. The outer sealing part and the inner sealing part define an intermediate space between the outer sealing part and the inner sealing part, the outer sealing part and the inner sealing part being configured to seal off the intermediate space from both an exterior and an interior of the joint, and the intermediate space is configured to be in fluid contact with both the first part and the second part.

The provided sealing device can be used to seal off a joint gap of a joint towards both the exterior of the joint such that washing liquid etc. cannot come into the joint, and towards the interior of the joint such that grease and oil cannot come out of the joint. Any accidental leakage will be collected in an intermediate space of the sealing device, and can be flushed away with a flushing fluid. Thereby growing of microorganisms or bacteria in the joint gap or in the joint is mitigated.

According to some embodiments, the spacing structure comprises a plurality of spacing elements spacing the outer sealing part from the inner sealing part. According to some embodiments, the plurality of spacing elements defines flow channels between the spacing elements. Thereby flushing fluid can pass through the spacing structure.

According to some embodiments, the spacing elements divide the annular intermediate space into two annular spaces, and the flow channels fluidly connect the two annular spaces. Thereby a flushing fluid can circulate on both sides of the spacing structure.

According to some embodiments, the outer sealing part comprises a first outer side face designed to abut a first face of the first part, and a second outer side face designed to abut a first face of the stationary part. Thereby a fluid tight sealing is achieved between the exterior of the joint and the intermediate space.

According to some embodiments, the outer sealing part comprises a first biasing means biasing the first outer side face and the second outer side face towards the first face of the first part and the first face of the second part, respectively. Thereby an increased contact pressure and consequently an improved sealing performance of the outer sealing part is achieved.

According to some embodiments, the first outer side face and/or the second outer side face have a structure that prevents advancement of the sealing device into the exterior of the joint and/or into the interior of the joint. Thereby the sealing device is supported from sliding out of the joint gap.

According to some embodiments, the outer sealing part is designed to rest against a heel of the rotatable part and/or a heel of the stationary part, to prevent advancement of the sealing device into the interior of the joint.

According to some embodiments, the inner sealing part comprises a third outer side face designed to abut a second face of the first part, and a fourth outer side face designed to abut a second face of the second part. Thereby a fluid tight sealing is achieved between the intermediate space and the interior of the joint.

According to some embodiments, the inner sealing part comprises a second biasing means biasing the third outer side face and the fourth outer side face towards the second face of the first part and the second face of the second part, respectively. Thereby an increased contact pressure and consequently an improved sealing performance of the inner sealing part is achieved.

According to some embodiments, the sealing device is made in one piece. Thereby the sealing device is more easily put in place, and can be more easily manufactured.

According to some embodiments, the intermediate space is defined by some of the faces of the first part, and some of the faces of the of the second part. Thereby the intermediate space is configured to be in fluid contact with the first part and the second part.

According to some embodiments, the sealing device is symmetrical about at least one radial plane.

According to a second aspect, the disclosure relates to a robot comprising at least one joint, and a sealing device according to any of the embodiments as disclosed herein arranged to seal the joint. Thereby a sealing of the robot is achieved that makes it possible to use for working in the protein industry.

According to some embodiments, the robot comprises a plurality of axes each arranged with a rotatable part and a stationary part, and a sealing device according to any of the embodiments as described herein arranged to seal the rotatable part and the stationary part.

According to some embodiments, the robot comprises a flushing arrangement including tubes to pass flushing fluid to and from each intermediate space of each sealing device. Thus, the intermediate space is in fluid connection with a flushing fluid path such that the intermediate space can be flushed with a flushing fluid to thereby remove any leaked fluid out of the intermediate space.

According to some embodiments, the robot comprises hollow spaces where the tubes are arranged.

According to some embodiments, the robot comprises a fluid inlet for passing flushing fluid to the intermediate space, and a fluid outlet for passing flushing fluid from the intermediate space.

According to some embodiments, the robot comprises a fluid inlet that is arranged to promote circular flow of flushing fluid in the intermediate space.

According to a third aspect, the disclosure relates to a system comprising a robot according to any of the embodiments as described herein, and a pump for pumping flushing fluid in the tubes.

DETAILED DESCRIPTION

To manage high hygienic design criteria for food equipment, the disclosure proposes a mechanical sealing device for providing a fluid-tight sealing of a joint comprising a first part and a second part with a relative movement in between. The sealing device thus seals a joint gap between the first part and the second part of the joint, that may be rotatable in relation to each other. The joint is for example a joint of a robot. The sealing device creates a closed intermediate space that can be flushed with a flushing fluid, to scavenge micro-organisms or other impurities that enter the intermediate space.

Figure 1:
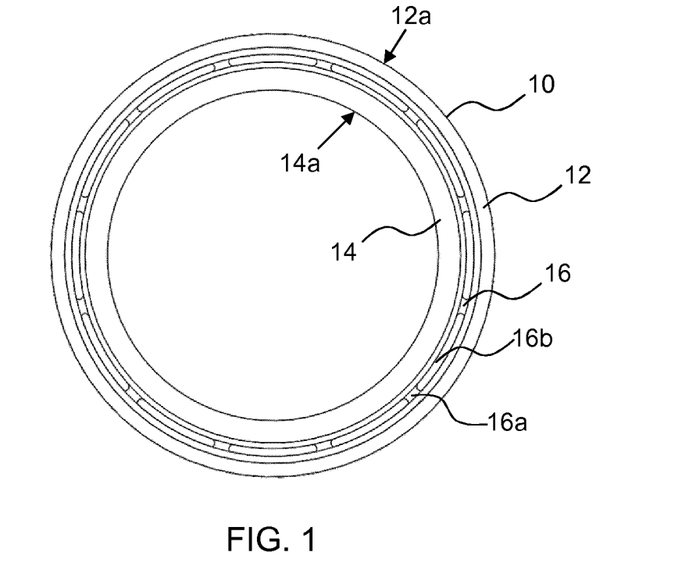
FIG. 1 illustrates a sealing device in isolation according to some embodiments.

FIG. 1 illustrates an exemplary sealing device 10. The sealing device 10 has an annular shape. The sealing device 10 comprises an outer sealing part 12, an inner sealing part 14 and a spacing structure 16. The spacing structure 16 connects the outer sealing part 12 and the inner sealing part 14. The outer sealing part 12 is designed to be an outer barrier against material from the outside of the joint. In more detail, the outer sealing part 12 has a first outer face 12a that is designed to act as a barrier against washing fluid, particles from production etc. to enter the joint gap. The inner sealing part 14 is designed to be an inner barrier against material from the interior of the joint. In more detail, the inner sealing part 14 has a second outer face 14a that is designed to act as a barrier against contaminants from the interior of the joint, such as grease and oil, to exit the joint. The inner sealing part 14 is located radially within the outer sealing part 12. The outer sealing part 12 is annular, and thus has a greater radius than the inner sealing part 14, which is also annular. The outer sealing part 12 and the inner sealing part 14 are thus radially spaced from each other, spaced by the radial extension of the spacing structure 16. The sealing device 10 is symmetrical about at least one radial plane. The sealing device 10 may be made in one piece, for example by means of heat molding or pressure molding. The sealing device 10 may be made of rubber or other kind of polymer.

Figure 4:
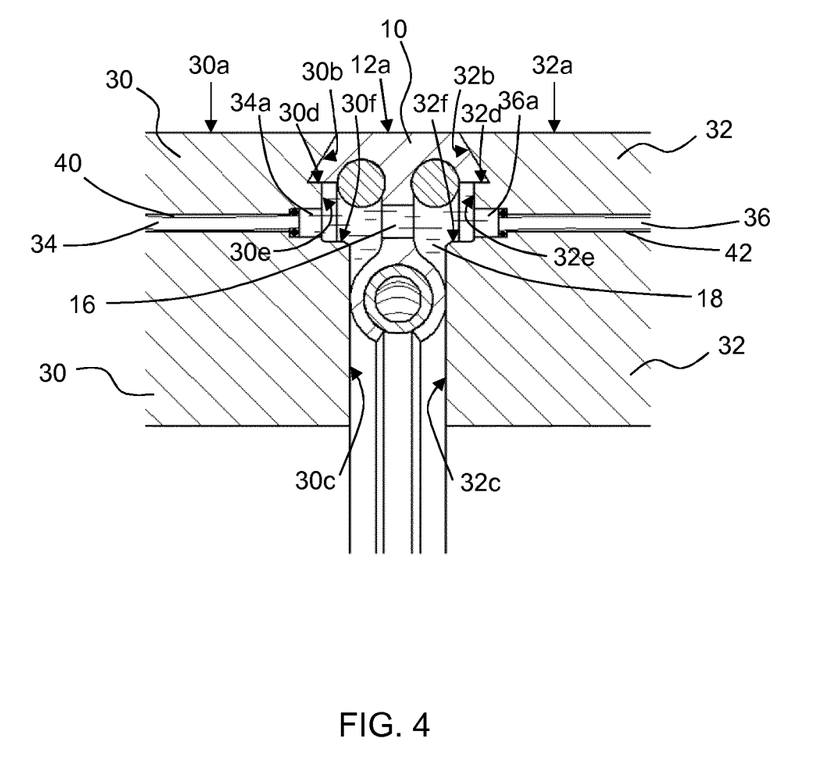
FIG. 4 illustrates a cross-section of the sealing device arranged between a first part and a second part of a joint of a robot.

The spacing structure 16 comprises a plurality of spacing elements 16a spacing the outer sealing part 12 from the inner sealing part 14. The spacing elements 16a extend radially from a first inner face 12d of the outer sealing part 12 to a second inner face 14d of the inner sealing part 14. The first inner face 12d is facing the second inner face 14d. The number of spacing elements is here twelve (12), but may be a different number such as 2, 3, 4, 6, 8, 10, 14, 16, 18, 20 etc, or any number in between. The plurality of spacing elements 16a defines flow channels 16b between the spacing elements 16a, such that flushing fluid may flow from a fluid inlet 36a to a fluid outlet 34a of a second part 32 and a first part 30 of a joint, respectively (FIG. 4). The flow channels enable fluid to pass from one side of the spacing structure 16 to the other side, through the flow channels 16b. The number of flow channels 16b is dependent on the number of spacing elements 16a, and is generally the same number as the number of spacing elements 16a. The flow channels 16b are here evenly distributed. A purpose of the spacing elements 16a is to separate the outer sealing part 12 from the inner sealing part 14 with a predetermined distance to create an intermediate space in between the outer sealing part 12 and the inner sealing part 14.

Figure 2:
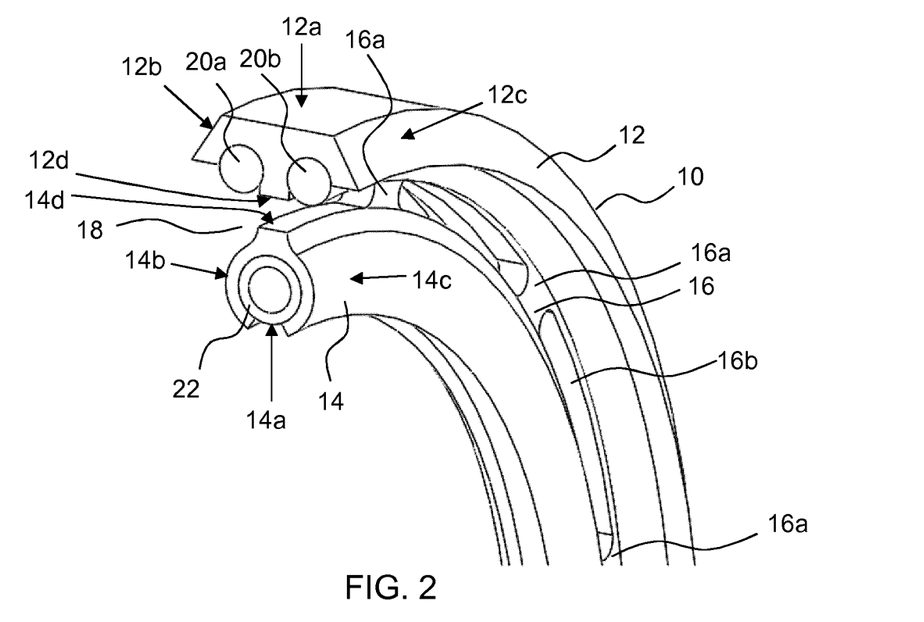
FIG. 2 illustrates a cross section of the sealing device of FIG. 1 according to some embodiments.

FIG. 2 illustrates a part of the sealing device 10 and a cross section of the sealing device 10. As already explained, the outer sealing part 12 comprises a first outer face 12a and a first inner face 12d. The first inner face 12d is facing the intermediate space 18, and is arranged opposite the first outer face 12a. As can be seen in the FIG. 2, the outer sealing part 12 also comprises a first outer side face 12b and a second outer side face 12c, connected to the first outer face 12a and the first inner face 12d. The first outer side face 12b and the second outer side face 12c are tapered towards the first outer face 12a. Alternatively, only one face of the first outer side face 12b and the second outer side face 12c is tapered. The faces 12a, 12b, 12c, 12d delimit a body of the outer sealing part 12. The outer sealing part 12 also comprises a first biasing means 20a, 20b biasing the first outer side face 12b and the second outer side face 12c. The first biasing means 20, 20b thus strives to maintain the shape of the outer sealing part 12. The first biasing means 20a, 20b includes a first torus 20a and a second torus 20b. The first torus 20a and the second torus 20b are halfway embedded into the body of the outer sealing part 12 along the first inner face 12d. Alternatively, the first biasing means 20a, 20b is completely embedded into the body of the outer sealing part 12. The first biasing means 20a, 20b is for example made of steel or other kind of material with a memory that wants to regain its shape after being bent.

As already explained, the inner sealing part 14 comprises a second outer face 14a and a second inner face 14d. The second inner face 14d is facing the intermediate space 18, and is arranged opposite the second outer face 14a. The inner sealing part 14 also comprises a third outer side face 14b and a fourth outer side face 14c, connected to the second outer face 14a and the second inner face 14d. The faces 14a, 14b, 14c, 14d delimit a body of the inner sealing part 14. The body has a shape of a hollow torus. The inner sealing part 14 also comprises a second biasing means 22 biasing the third outer side face 14b and the fourth outer side face 14c. The second biasing means 22 has a shape of a hollow torus. The second biasing means 22 is completely embedded inside the hollowness of the body of the inner sealing part 14. The inner sealing part 14 exhibits an incision through the body of the inner sealing part 14 where through the second biasing means 22 may be inserted into the hollowness of the body. The body thus exhibits an annular hole that is designed to tightly accommodate the second biasing means 22. The incision extends along a radial plane of the torus, through one side of the torus.

Figure 3A:
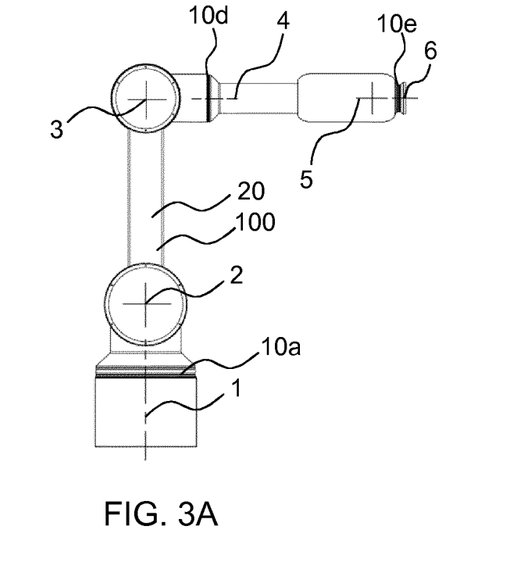
FIG. 3A illustrates a robot with six axes and a plurality of sealing devices sealing the axes.
Figure 3B:
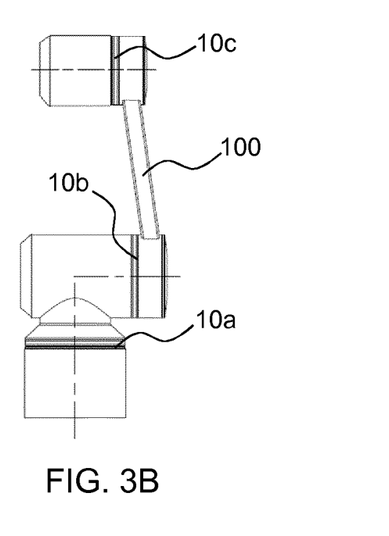
FIG. 3B illustrates the robot of FIG. 3 in a perpendicular view.

FIGS. 3A and 3B illustrate an industrial robot 100 with six (6) axes. Each axis comprises a joint with a first part 30 and a second part 32 (FIG. 4) that are rotatable in relation to each other, for example one part is arranged stationary to the driving motor of the axis, and one part arranged in relation to the outgoing shaft of the driving motor. Between each first part 30 and second part 32 there is a joint gap, and a sealing device 10 can be arranged to seal the joint gap. Thus, the sealing device 10 is arranged to seal the first part 30 and the second part 32 of each joint. In the figures, the joint gap of the first axis 1 is sealed with a first sealing device 10a, the joint gap of the second axis 2 is sealed with a second sealing device 10b, the joint gap of the third axis 3 is sealed with a third sealing device 10c, the joint gap of the fourth axis 4 is sealed with a fourth sealing device 10d, the joint gap of the fifth axis 5 is sealed with a fifth sealing device 10e and the joint gap of the sixth axis 6 is sealed with a sixth sealing device 10f.

FIG. 4 illustrates a cross section of the sealing device 10 of FIGS. 1 and 2, arranged to seal a joint, for example a joint of the robot of FIGS. 3A-3B. The sealing device 10 is arranged in the joint gap between a first part 30 and a second part 32 of the joint. The first part 30 exhibits an exterior face 30a that is the face of the first part 30 towards the exterior of the joint or robot. The first part 30 also has a plurality of faces or surfaces delimiting the joint gap between the first part 30 and the second part 32, namely a first face 30b, a second face 30c, a third face 30e, fourth face 30e and a fifth face 30f. The second part 32 also exhibits an exterior face 32a that is the face of the second part 32 towards the exterior of the joint or robot. The second part 32 also has a plurality of faces or surfaces delimiting the joint gap between the first part 30 and the second part 32, namely a first face 32b, a second face 32c, a third face 32d, a fourth face 32e and a fifth face 32f. The exterior faces 30a, 32a, the third faces 30d, 32d and the fifth faces 30f, 32f are radial surfaces. The first faces 30b, 32b are tapered surfaces towards the exterior of the joint, and match the tapered sides or faces of the outer sealing part 12. The second faces 30c, 32c and the fourth faces 30e, 32e are axial surfaces. Regarding the first part 30, the first face 30b is connected to the third face 30d, which in turn is connected to the fourth face 30e. The fourth face 30e is connected to the fifth face 30f, and the fifth face 30f is connected to the second face 30c. Regarding the second part 32, the first face 32b is connected to the third face 32d, which in turn is connected to the fourth face 32e. The fourth face 32e is connected to the fifth face 32f, and the fifth face 32f is connected to the second face 32c. The inlet 36a is provided in the surface of the fourth face 32e of the second part 32, and the outlet 34a is provided in the surface of the fourth face 30e of the first part 30.

As seen from the FIG. 4, the first outer face 12a of the outer sealing part 12 is aligned with the exterior face 30a of the first part 30 and the exterior face 32a of the second part 32, and are thus in the same plane. The outer sealing part 12 is designed to contact both the first part 30 and the second part 32, and the inner sealing part 14 is designed to contact both the first part 30 and the second part 32. More specifically, the first outer side face 12b is designed to abut, or lay against, the first face 30b of the first part 30. The second outer side face is 12c designed to abut, or lie against, the first face 32b of the second part 32. The first biasing means 20a, 20b is biasing the first outer side face 12b and the second outer side face 12c of the outer sealing part 12 towards the first face 30b of the first part 30 and the first face 32b of the second part 32, respectively. The third outer side face 14b of the inner sealing part 14 is designed to abut, or lie against, the second face 30c of the first part 30, and the fourth outer side face 14c of the inner sealing part 14 is designed to abut, or lie against, the second face 32c of the second part 32. The second biasing means 22 is biasing the third outer side face 14b and the fourth outer side face 14c of the outer sealing part 14 towards the second face 30c of the first part 30 and the second face 32c of the second part 32, respectively.

The outer sealing part 12 and the inner sealing part 14 define an intermediate space 18 between the outer sealing part 12 and the inner sealing part 14. The intermediate space 18 is thus configured to be in fluid contact with both the outer sealing part 12 and the inner sealing part 14, and more specifically the first inner face 12d and the second inner face 14d. The intermediate space 18 is also defined by faces of the first part 30 and the second part 32, and is thus configured to be in fluid contact with both the first part 30 and the second part 32. More specifically, the intermediate space 18 is defined by part of the second face 30c, the fourth face 30e and the fifth face 30f of the first part 30, and by part of the second face 32c, the fourth face 32e and the fifth face 32f of the second part 32. The intermediate space 18 is also defined by the spacing structure 16, and the spacing elements 16a divide the annular intermediate space 18 into two annular spaces. The flow channels 16b fluidly connect the two annular spaces, and fluid may flow between the annular spaces through the flow channels 16b. As can be seen from FIG. 4, the outer sealing part 12 and the inner sealing part 14 are configured to seal off the intermediate space 18 from both an exterior and an interior of the joint. The intermediate space 18 is thus a confined space, that is only open for access via the fluid inlet (or several inlets) 36a and the fluid outlet (or several outlets) 34a in the first part 30 and the second part 32 for passing of flushing fluid to and from the intermediate space 18, when the sealing device 10 is properly arranged in the joint gap. The fluid inlet 36a may be arranged to promote circular flow of flushing fluid in the intermediate space 18. For example, the fluid inlet 36a may be arranged in a tangential direction of the intermediate space 18.

The sealing device 10 should be securely arranged in the joint gap, to withstand pressure both from the outside of the joint, and from the inside of the joint, and also to withstand the rotating motion of the first part 30 and/or the second part 32. For that purpose the first outer side face 12b and the second outer side face 12c have a structure that prevents advancement of the sealing device 10 into the exterior of the joint and/or into the interior of the joint. Alternatively, only one of the first outer side face 12b and the second outer side face 12c has such a structure. The structure is illustrated in FIG. 4, where the third face 30d of the first part 30 in the form of a heel mates with a part of the first inner face 12d. The third face 32d of the second part 32 in the form of another heel mates with an oppositely located part of the first inner face 12d. Thus, the outer sealing part 12 is designed to rest, or lie, against the face 30d of the heel of the first part 30 and against the face 32d of another heel of the second part 32, to prevent advancement of the sealing device 10 into the interior of the joint.

Figure 5:
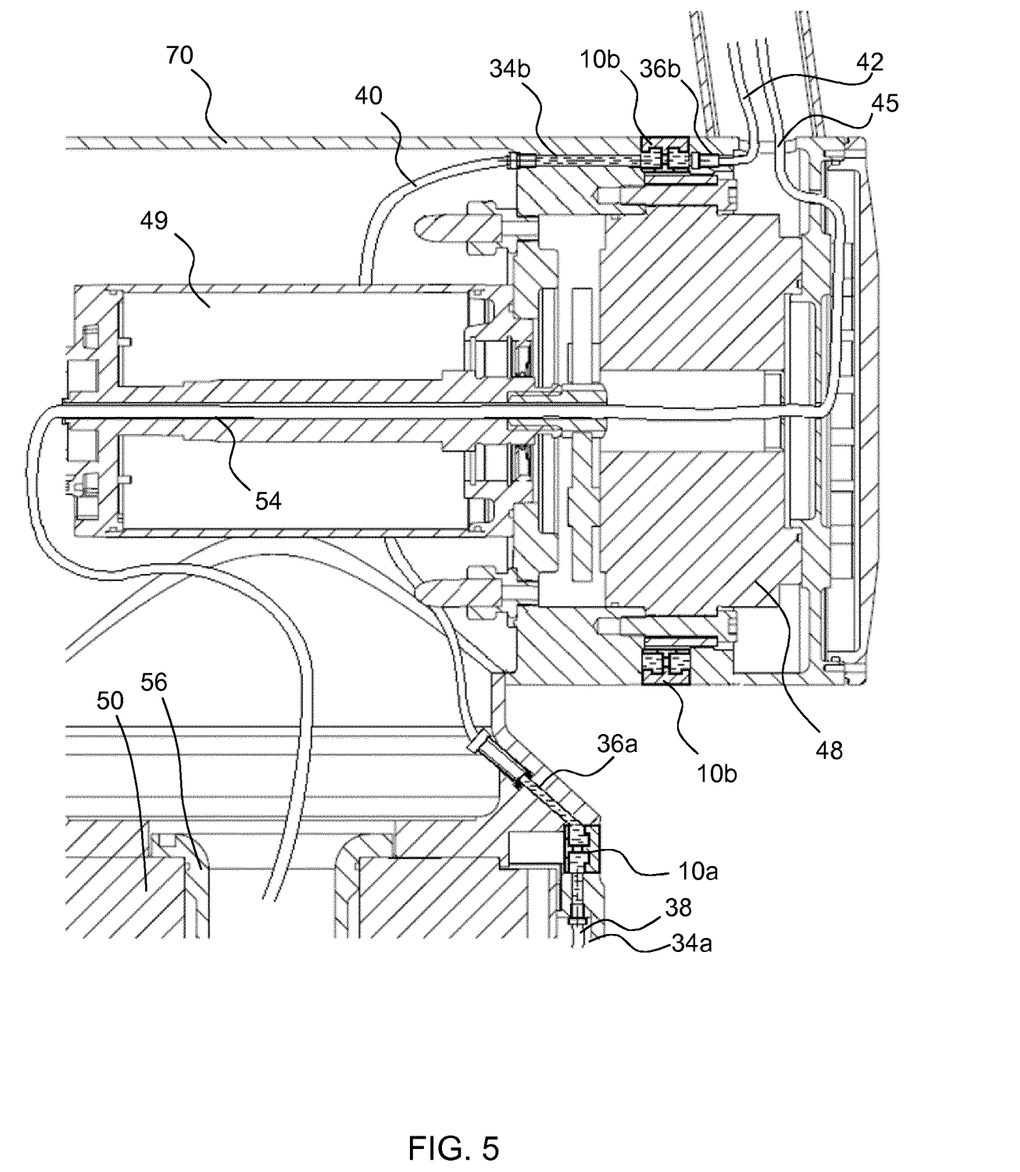
FIG. 5 illustrates two axes of a robot, each axis being provided with a sealing device.

FIG. 5 illustrates an enlarged view of the second axis 2 and part of the first axis 1 of the robot 100 in FIGS. 3A and 3B, where the first sealing device 10a and the second sealing device 10b can be seen sealing the joint gap of the first axis 1 and the joint gap of the second axis 2. The robot 100 comprises a flushing arrangement including tubes 38, 40, 42, 45 to pass flushing fluid to and from the intermediate space 18 of each sealing device 10. The robot 100 thus comprises tubes serially connecting the intermediate spaces of the sealing devices 10 (10a-10f). The tubes are arranged in hollow spaces of the robot 100, such as hollow shafts of the motors and transmissions. More in detail is a tube 45 arranged in hollow spaces such as through the hollow shaft 54 of the motor 49 and transmission 48 and the hollow shaft 56 of the transmission 50, to pass flushing fluid from a source to the furthest away located intermediate space, and thereafter through all the intermediate spaces. In this detailed view, a tube 42 is arranged to pass flushing fluid from another intermediate space not shown in the figure, to the intermediate space of the second sealing device 10b. The tube 42 is arranged in a hollow space of the robot 100, inside an enclosure, and at least partly in a channel 36b in the body of the robot 100. A second tube 40 is arranged to pass the used flushing fluid from the intermediate space of the second sealing device 10b to the intermediate space of the first sealing device 10a. The second tube 40 is arranged at least partly in a channel 34b and another channel 36a in the body of the robot 100, and inside an enclosure 70 of the robot 100. A third tube 38 is arranged to pass flushing fluid from the intermediate space of the first sealing device 10b back to a reservoir, a drain or similar. The third tube 38 is as least partly arranged in a channel 34a in the body of the robot 100. After the flushing fluid has been passed to all intermediate spaces of the sealing devices 10a-10f, the used flushing fluid is thus passed to the reservoir.

Figures 6, 7:
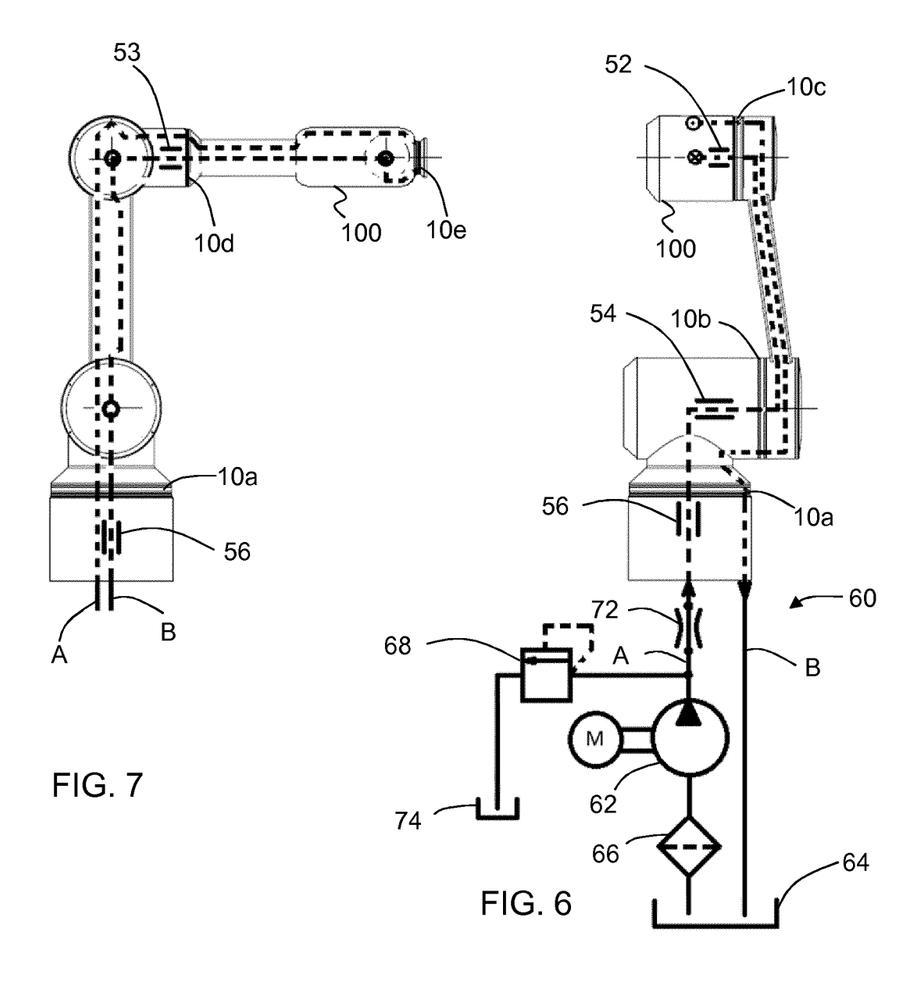
FIG. 6 illustrates a flushing arrangement for passing flushing fluid in a fluid path of a robot.
FIG. 7 illustrates a fluid path for a flushing fluid inside a robot.

FIG. 6 illustrates the flow path A, B of the flushing fluid including the intermediate spaces of the sealing devices 10a-10f, and a flushing arrangement 60 comprising tubes for passing the flushing fluid along the flow path A, B through hollow spaces in the robot 100, for example through the hollow shafts 52, 53, 54, 56 and inside the enclosure 70. The flushing arrangement 60 comprises a pump 62 for pumping the fluid in the flow path A from a flushing fluid reservoir 64, optionally via a filter 66. The pump 62 is thus used for pumping flushing fluid in the tubes. The used flushing fluid may be passed back to the flushing fluid reservoir 64, and can thus be filtered before the flushing fluid is used again. The filter 66 is for example a particle filter or a membrane filter. A relief valve 68 is provided in an auxiliary flow path downstream the pump 62, but before the flushing fluid enters the robot 100, to expel flushing fluid in case of overpressure in the flow path, for example into a container 74. The flow path A is also provided with a constant flow valve 72 providing a constant flow in the flow path A. The FIG. 7 illustrates the flow path of the flushing fluid from another side of the robot 100. The flushing is performed regularly, for example during nights when the robot 100 also is cleaned from the outside. The flushing is performed for a certain period of time, for example 0.5-1 hour. The flushing fluid is for example a sterile fluid, such as condensate, sterile water or steam. The flushing fluid may be mixed with an agent that mitigates bacterial and microorganism growth or simply kills bacteria and microorganism. The flow has here been shown as being passed through the flow path A first and thereafter flow path B, but the opposite flow is also possible, thus through the flow path B first and thereafter flow path A. The flow path A may thus extend from the flushing fluid reservoir 64 to the inlet of the furthest away located intermediate space, here in the sixth axis, and the flow path B extends from the inlet of the same furthest away located intermediate space via all the other intermediate spaces and back to the flushing fluid reservoir 64, or vice versa.

The present invention is not limited to the above-described preferred embodiments. Various alternatives, modifications and equivalents may be used. For example, while the disclosure refers to an embodiment where the relative movement between the first part 30 and a second part 32 occurs between surfaces that are axial or at least have axial direction components, the invention can also be applied in joints between two radial surfaces, such as between a shaft and a shaft passage. Moreover, the relative movement is not limited to a rotational movement but can also contain or consist of a linear movement. Therefore, the above embodiments should not be taken as limiting the scope of the invention, which is defined by the appending claims.

The invention claimed is:

1. An industrial robot comprising at least one joint and a sealing device for providing a fluid-tight sealing of the joint, wherein the joint has a first part and a second part with a relative movement in between, the sealing device comprising:

an outer sealing part designed to contact the first part and the second part, the outer sealing part includes a first outer side face designed to abut a first face of the first art and a second outer side face designed to abut a first face of the second part, an inner sealing part designed to contact the first part and the second part, the inner sealing part includes a third outer side face designed to abut a second face of the first art and a fourth outer side face designed to abut a second face of the second part, a spacing structure connecting the outer sealing part and the inner sealing part and having a plurality of radially extending spacing elements, wherein the outer sealing part and the inner sealing part define an annular intermediate space between the outer sealing part and the inner sealing part, wherein the outer sealing part and the inner sealing part are configured to seal off the annular intermediate space from both an exterior and an interior of the joint, wherein the annular intermediate space is configured to be in fluid contact with both the first part and the second part, and wherein the sealing device is made in one piece.

2. The industrial robot according to claim 1, wherein the plurality of spacing elements is designed to space the outer sealing part from the inner sealing part.

3. The industrial robot according to claim 2, wherein the plurality of spacing elements define flow channels between the spacing elements.

4. The industrial robot according to claim 3, wherein the spacing elements divide the annular intermediate space into two annular spaces, and wherein the flow channels fluidly connect the two annular spaces.

5. The industrial robot according to claim 1, wherein the outer sealing part comprises a first biasing means biasing the first outer side face and the second outer side face towards the first face of the first part and the first face of the second part, respectively.

6. The industrial robot according to claim 1, wherein the first outer side face and/or the second outer side face has a structure that prevents advancement of the sealing device into the exterior of the joint and/or into the interior of the joint.

7. The industrial robot according to claim 5, wherein the inner sealing part comprises a second biasing means biasing the third outer side face and the fourth outer side face towards the second face of the first part and the second face of the second part, respectively.

8. The industrial robot according to claim 1, wherein the intermediate space is defined by some of the faces of the first part, and some of the faces of the second part.

9. The industrial robot according to claim 1, wherein the sealing device is symmetrical about at least one radial plane.

10. The industrial robot according to claim 1, wherein the intermediate space is only open for access via a fluid inlet in the first part and a fluid outlet in the second part, and wherein the robot further comprises a flushing arrangement including tubes to pass flushing fluid to and from the intermediate space of the sealing device through the fluid inlet and the fluid outlet.

11. The industrial robot according to claim 1, wherein the robot comprises hollow spaces where the tubes are arranged.

12. The industrial robot according to claim 5, wherein the first outer side face and/or the second outer side face has a structure that prevents advancement of the sealing device into the exterior of the joint and/or into the interior of the joint.

* * * * *